July 22, 1952　　　W. H. PAYNE　　　2,604,230
LIQUID SUPPLY TANK
Filed April 28, 1948
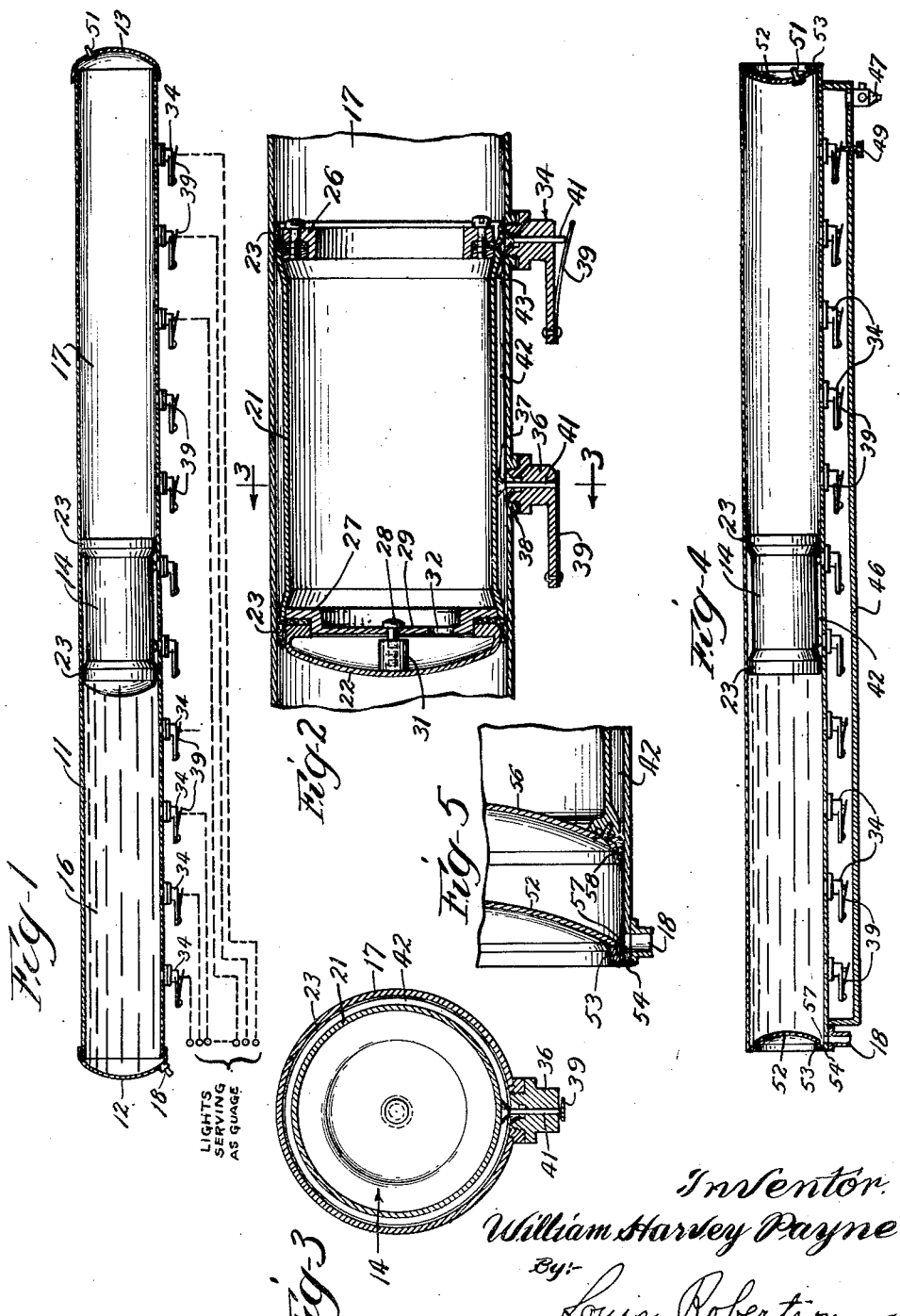
Inventor.
William Harvey Payne
By:-
Louis Robertson Atty.

Patented July 22, 1952

2,604,230

UNITED STATES PATENT OFFICE 2,604,230

LIQUID SUPPLY TANK

William Harvey Payne, Hinsdale, Ill.

Application April 28, 1948, Serial No. 23,845

8 Claims. (Cl. 222—43)

There are numerous instances in which a liquid is to be stored and delivered under pressure to a point of use. In some instances very special requirements must be met.

For example, in storing liquid oxygen the equipment must be capable of functioning at very low temperatures. Nevertheless, an extremely dependable and uniform supply of the liquid oxygen is desired for many purposes as, for example, in connection with jet propulsion. In the case of aircraft or rockets, weight reduction is also important. It is often necessary to avoid admixture of the liquid with any gas. This introduces special problems when pressure is to be maintained on the liquid by means of a gas under pressure. In some instances, whether with liquid oxygen or other liquids, quick response to varying demands is important, as in hydraulic controls of various sorts.

An object of the present invention is to provide liquid supply means capable of meeting specialized requirements such as the foregoing.

Additional objects and advantages will be apparent from the following description and from the drawings in which:

Figure 1 is a vertical sectional view through a form of the invention especially suitable for low pressure supply of a liquid.

Fig. 2 is a fragmentary view on an enlarged scale showing a vertical cross-section through the piston of Fig. 1.

Fig. 3 is a transverse vertical cross-section taken approximately on the line 3—3 of Fig. 2.

Fig. 4 is a view similar to Fig. 1 but showing a liquid supply tank adapted for higher pressures.

Fig. 5 is a fragmentary sectional view showing details of the structure of Fig. 4.

Although the law requires a full and exact description of one or more forms of an invention, such as that which follows, it is of course the purpose of a patent to cover each new inventive concept therein no matter how it may later be disguised by variations in form or additions of further improvements; and the claims are intended to accomplish this purpose by particularly pointing out the parts, improvements or combinations in which the inventive concepts are found.

In the form of invention shown in Fig. 1, the apparatus includes a tank 11 of cylindrical shape closed by caps 12 and 13. Within the tank is positioned a piston 14 which is slidable along the tank but seals the space at one end of the tank in which liquid oxygen 16 may be stored from the space 17 at the other end of the tank.

Gas under pressure in the space 17 may press the piston 14 against the liquid 16 to maintain it under pressure. Under the influence of this pressure the liquid may flow through outlet 18 and a suitable conduit to a position of desired use of the liquid.

Although the piston may take a variety of forms, certain of the features illustrated in Fig. 2 are preferred. Thus the piston preferably includes a tubular jacket 21 closed at one end by a piston head 22 and open at the other end so that the space within the jacket 21 may be used for part of the gas storage. At each end of jacket 21 a sliding annular seal 23 is provided. These seals should be effective against pressures in the tank beyond the seals and in excess of pressure between the seals. Thus if cupped washers are used, as shown, each cup will face away from the piston. Any suitable material may be used for the cupped washers 23. When liquid oxygen is used they, or especially the one exposed directly to the liquid oxygen, must be capable of withstanding the temperature of liquid oxygen while still retaining sufficient flexibility to perform its sealing function. As an alternative to using flexible sealing members 23, the internal walls of tank 11 may be ground and honed or polished and rigid sealing members may be honed to fit the inside walls with such a snug sliding fit that there will be substantially no leakage.

The seals 23 may be secured in any suitable manner. For example, at the open end of the piston 14 a ring 26 may be used as seen in Fig. 2. A similar ring could be used at the closed end of the piston 14, in which event the head 22 could be integral with the jacket 21. In the illustrated form of the invention, however, the head 22 forms at its periphery a ring for holding the seal 23 sealed to an annular seat 27 formed by a jacket 21 or by a separate member carried by the jacket.

The head 22 may be drawn into clamp position by a bolt 28 passing through a brace or spider and screwing into a lug 31 carried or formed on the inside of head 22. Openings 32 through the spider may be provided to utilize the space between the piston head 22 and the spider. Alternatively, the member 29 may be a solid wall sealed to the jacket 14 and to the bolt 28 for utmost protection against leakage.

It is probably impossible to have absolutely dependable sealing by the seals 23. It is therefore desirable to provide some bleed-off between the seals so that there will be no danger that gas will leak into the liquid 16. The bleed-off may be provided by a series of valve units 34. As seen in Fig. 2, each valve unit 34 may comprise a valve housing 36 and a poppet valve 37. The valve housing 36 may be threaded to a boss 38 on the tank to which it may be sealed by a suitable gasket. Each of the poppet valves 37 is urged inwardly toward open position by a spring 39 which engages valve stem 41. The spring 39 is a light spring incapable of opening the valve against the pressure within the storage spaces of the tank, even though the tank is for low pressure purposes, such as 2 lbs. per square inch. However, at least one of the valves will always be positioned between the seals 23. Hence there will always be an annular chamber 42 surrounding the jacket 21 which will be at the same pressure as that on the outside of poppet valve 37. Accordingly, the spring 39 will open the valve 37 which is exposed to the relief chamber 42. As the liquid is used, so that the piston 14 slides along tank 11, the piston 14 will slide over another valve so that its spring 39 will open it. With a little further movement of the piston 14, the flaring wall 43 of jacket 14 will cam the first valve downwardly and it will be pressed closed by seal member 23. As the seal member 23 passes beyond it so as to leave it exposed to the gas in chamber 17, the gas pressure will hold the valve closed.

Fig. 4 illustrates a form of the invention which is adapted for storage and supply of a liquid under high pressure, such as 5,000 lbs. per square inch. Except for heavier wall structure, this form of the invention may be substantially the same as that shown in Figs. 1 to 3. Preferably, however, the valves 34 are enclosed within a housing or conduit 46 which communicates with a pressure relief valve 47. This permits the maintenance in the relief chamber 42 of a pressure only slightly lower than the pressure in the storage chambers of the tank. As a result, any leakage through the seal portions 23 will be reduced to a minimum. A sealed screw or plunger 49 may be provided in alignment with one or more of the valve stems 41 to reduce the pressure in the bleed-off chamber initially so that the valves will function automatically as described.

With both forms of the invention, the tank may be initially charged with a quantity of liquid and a quantity of gas, such as helium, under pressure. As the liquid is drawn off, the gas will expand moving the piston to maintain pressure on the liquid. In some instances additional gas may be supplied through a valve gas inlet 51 to maintain the pressure constant. In other instances, the pressure may be maintained constant by heating the gas to raise its temperature. When the gas pressure is not maintained constant the delivered liquid pressure may nevertheless be maintained constant by delivering the liquid through a pressure-reducing valve. In that event the initial gas pressure will be considerably higher than required liquid pressure.

The length of the piston 14 between its two seals is preferably at least as great as the diameter of the tank so as to ensure smooth sliding of the piston. This does not represent inefficient use of the space inasmuch as the space within the piston is used for gas storage. Even when the pressure of the gas is maintained by supplying more gas or heat, a substantial volume of gas under pressure is sometimes desired. If the use of the liquid is not constant, the initial gas volume can maintain adequate pressure during a short period of rapid use and a small pump can gradually restore the gas pressure before the next rapid use of the liquid. A piston length even longer than the diameter of the tank is even more desirable because it gives greater certainty of smooth action and requires fewer valve units 34.

It should be understood that with the construction shown the valve units must be flush with the inside of the tank and free from depressions which would cause leaks around the seal 23 when the seal happens to lie over the valve. This may require grinding and polishing the inner faces of the valve unit after its application. This difficulty can be avoided by providing twin seals in place of each of the seals 23, the spacing of the two seals of one pair being sufficient to straddle the inwardly exposed face of one of the valve units. Perhaps it can be avoided more simply by having the entire inner face of a valve unit small enough to be sealed over completely by a single seal, the valve units in Fig. 2 being shown a little oversize for clarity.

The tank is preferably positioned with the valves at the bottom so that any liquid leaking into the annular chamber will drain out by gravity. This is not essential, however, and the tank can be disposed in any position.

It will be observed that the piston is quite light in weight, being hollow. This is desirable to reduce inertia when there is considerable fluctuation in the rate of withdrawal of the liquid through the tank outlet 18.

Fig. 5 shows a preferred construction of the end of the tank and the head of the piston where high pressures are used as in Fig. 4. A concave end plate 52 is welded and thereby sealed to a ring 53 which in turn is welded to the cylindrical side wall 54 of the tank. The concave piston head 56 has the same radius of curvature as the end plate 52. The end plate 52 is of slightly smaller diameter than the inside diameter of the tank wall 54 so as to form a recess 57 into which the seal 58 moves at the end of the movement of the piston so that substantially all of the liquid may be pressed out of the tank.

If desired, the valve units 34 may be utilized for actuating a fuel gauge. Thus, as diagrammatically illustrated in Fig. 1, each valve unit may control one of a string of lights or other indicators on a panel. The control may take any of a variety of forms. For example, there may be a simple contact carried by each spring 39 for directly controlling a light circuit. Where explosive mixture are likely to be present, such an exposed contact should be avoided. This could be done by using a hermetically sealed switch actuated by the spring or by using some form of electronic control such as photoelectric cells. Thus there could be associated with each valve 34 a light bulb and a photoelectric cell directed thereon through a slot in a fixed plate, light otherwise being excluded from the cell. A flag carried by the spring 39 or valve stem 41 could have a slot which in one position of the valve would be aligned with the first-named slot to admit light to the cell. In another position of the valve the slots would be out of alignment so that light would be shut off from the cell. The output of each cell would be amplified to control a panel light or other indicator.

It will be apparent that before the tank is filled the valves will all be open, there being no internal pressure to close them. Any suitable means may be provided for closing them during filling until a sufficient pressure is present to hold them closed, although in the case of the form shown in Fig. 4 it may be sufficient to rely on the pressure relief valve 47, or perhaps to provide an additional manual valve of large enough flow capacity to suddenly release the pressure in conduit 46 so that the valves will snap closed. In Fig. 1 the springs 39 could all be held away from their respective valve stems by a wedge temporarily placed between each spring and the valve body. It is believed to be sufficient, however, merely to start the piston at either end and fill it perhaps rapidly from the end at which it is located. As each valve is then exposed at that end, as the piston passes it, it will be subjected to sufficient internal pressure to hold the valve closed. To ensure sufficient pressure during this filling, the piston could be started at the left-hand end and a friction brake applied at its right end which would be moved to the right end of the tank and then left there during the discharge stroke of the piston.

I claim:

1. A liquid supply apparatus including a cylindrical tank having a liquid outlet at one end, a free piston in the tank having a sealed sliding engagement with the inner walls of the tank to slide axially of the tank, and a body of gas under pressure within the tank beyond the piston from said liquid outlet to maintain said liquid under pressure exerted thereon through the piston, said piston having a length at least as great as the diameter of the tank, having a sliding seal at each end thereof adapted to withstand pressure beyond the ends of the piston in excess of that between the seals, and being shaped with a substantially smaller diameter between the seals than the inside diameter of the tank to provide an annular chamber between the piston and the tank wall, and valves disposed along the length of the tank at intervals closer than the spacing of the seals so that at least one valve is always positioned to communicate with said annular chamber, said valves comprising valve members, carried by the wall of the tank, each movable inwardly thereof to open an outlet and urged inwardly by a spring, and cam means in the trailing end of the annular chamber which cams the valve members toward a closed position as the piston moves to bring a seal over the successive valves, said valves being constructed to be held closed by pressure exposed against the valve on the inside of the tank other than in said annular chamber; a conduit communicating with the outlets of said valves, and a pressure relief valve communicating with said conduit to relieve pressure in said conduit at a predetermined value.

2. A liquid supply apparatus including a cylindrical tank having a liquid outlet at one end, a free piston in the tank having a sealed sliding engagement with the inner walls of the tank to slide axially of the tank, and a body of gas under pressure within the tank beyond the piston from said liquid outlet to maintain said liquid under pressure exerted thereon through the piston, said piston having a length at least as great as the diameter of the tank, having a sliding seal at each end thereof adapted to withstand pressure beyond the ends of the piston in excess of that between the seals, and being shaped with a substantially smaller diameter between the seals than the inside diameter of the tank to provide an annular chamber between the piston and the tank wall, and valves disposed along the length of the tank at intervals closer than the spacing of the seals so that at least one valve is always positioned to communicate with said annular chamber, said valves comprising valve members, carried by the wall of the tank, each movable inwardly thereof to open an outlet and urged inwardly by a spring, and cam means in the trailing end of the annular chamber which cam the valve members toward a closed position as the piston moves to bring a seal over the successive valves, said valves being constructed to be held closed by pressure exposed against the valve on the inside of the tank other than in said annular chamber.

3. A liquid supply apparatus including a cylindrical tank having a liquid outlet at one end, a free piston in the tank having a sealed sliding engagement with the inner walls of the tank to slide axially of the tank, and a body of gas under pressure within the tank beyond the piston from said liquid outlet to maintain said liquid under pressure exerted thereon through the piston, said piston having an outwardly facing cupped flexible seal at each end thereof adapted to withstand pressure beyond the ends of the piston in excess of that between the seals and being shaped with a smaller diameter between the seals than the inside diameter of the tank to provide an annular chamber between the piston and the tank wall, and means adapted to communicate with this chamber for bleeding leakage which passes either of said seals.

4. A liquid supply apparatus including a cylindrical tank having a liquid outlet at one end, a free piston in the tank having a sealed sliding engagement with the inner walls of the tank to slide axially of the tank, and a body of gas under pressure within the tank beyond the piston from said liquid outlet to maintain said liquid under pressure exerted thereon through the piston, said piston having a sliding seal at each end thereof adapted to withstand pressure beyond the ends of the piston in excess of that between the seals and being shaped with a smaller diameter between the seals than the inside diameter of the tank to provide an annular chamber between the piston and the tank wall, and means adapted to communicate with this chamber for bleeding leakage which passes either of said seals.

5. A liquid supply apparatus including a cylindrical tank having a liquid outlet at one end, a free piston in the tank having a sealed sliding engagement with the inner walls of the tank to slide axially of the tank, and a body of gas under pressure within the tank beyond the piston from said liquid outlet to maintain said liquid under pressure exerted thereon through the piston, said piston having spaced sliding seals with the tank spaced axially of the tank, and pressure-relief means communicating with the space between said seals and between said piston and the walls of the tank.

6. A liquid supply apparatus including a cylindrical tank having a liquid outlet at one end, a free piston in the tank having a sealed sliding engagement with the inner walls of the tank to slide axially of the tank, and a body of gas under pressure within the tank beyond the piston from said liquid outlet to maintain said liquid under pressure exerted thereon through the piston, said piston being hollow, light in weight, and open at one end toward the gas, said piston having spaced sliding seals with the tank spaced axially of the tank, and pressure-relief means for communicating with the space between said seals and between said piston and the walls of the tank during the entire travel of the piston to discharge any leakage past either seal.

7. A liquid supply apparatus including a cylindrical tank having a liquid outlet at one end, a free piston in the tank having a sealed sliding engagement with the inner walls of the tank to slide axially of the tank, and a body of gas under pressure within the tank beyond the piston from said liquid outlet to maintain said liquid under pressure exerted thereon through the piston, having a sliding seal at each end thereof adapted to withstand pressure beyond the ends of the piston in excess of that between the seals, and being shaped with a smaller diameter between the seals than the inside diameter of the tank to provide an annular chamber between the piston and the tank wall, and valves disposed along the length of the tank at intervals closer than the spacing of the seals so that at least one valve is always positioned to communicate with said annular chamber, said valves comprising valve members, carried by the wall of the tank, each movable inwardly thereof to open an outlet and urged inwardly by means effective while said annular chamber is adjacent the valve, and a gauge for indicating the quantity of liquid remaining in the tank comprising indicator means selectively controlled in response to movement of the valve members to indicate the position of the piston in the tank.

8. A liquid supply apparatus including a cylindrical tank having a liquid outlet at one end, a free piston in the tank having a sealed sliding engagement with the inner walls of the tank to slide axially of the tank, and a body of gas under pressure within the tank beyond the piston from said liquid outlet to maintain said liquid under pressure exerted thereon through the piston, said piston having spaced sliding seals with the tank spaced axially of the tank, and pressure-relief means for communicating with the space between said seals and between said piston and the walls of the tank during the entire travel of the piston to discharge any leakage past either seal.

WILLIAM HARVEY PAYNE.

REFERENCES CITED

The following references are of record in the file of this patent:

UNITED STATES PATENTS

| Number | Name | Date |
|---|---|---|
| 1,047,452 | Schottegen | Dec. 17, 1912 |
| 1,984,296 | Witter | Dec. 11, 1934 |
| 2,300,110 | De Hoog | Oct. 27, 1942 |